(12) United States Patent
Fourcade

(10) Patent No.: US 8,497,322 B2
(45) Date of Patent: *Jul. 30, 2013

(54) PEELABLE POLYETHYLENE FILMS

(75) Inventor: Pascal Fourcade, Tarbes (FR)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,433

(22) Filed: Jun. 19, 2012

(65) Prior Publication Data

US 2012/0259068 A1 Oct. 11, 2012

Related U.S. Application Data

(63) Continuation of application No. 10/564,109, filed as application No. PCT/EP2004/051388 on Jul. 7, 2004, now Pat. No. 8,258,237.

(30) Foreign Application Priority Data

Jul. 7, 2003 (EP) .................................... 03102027

(51) Int. Cl.
*C08L 9/06* (2006.01)
*C08L 53/02* (2006.01)
*C08L 23/06* (2006.01)
*C08L 23/04* (2006.01)
*C08J 5/18* (2006.01)

(52) U.S. Cl.
USPC .................. 525/98; 525/88; 525/95; 525/240

(58) Field of Classification Search
USPC ................ 525/88, 95, 98, 191, 232, 240, 241
See application file for complete search history.

(56) References Cited

U.S. PATENT DOCUMENTS

| 4,302,554 | A | * | 11/1981 | Nabeta et al. | 525/71 |
| 5,847,051 | A | * | 12/1998 | Hwo et al. | 525/98 |
| 5,973,071 | A | * | 10/1999 | Modic | 525/96 |
| 6,022,612 | A | * | 2/2000 | Wilkie | 428/215 |
| 8,258,237 | B2 | * | 9/2012 | Fourcade | 525/98 |

FOREIGN PATENT DOCUMENTS

WO    WO 0115897 A1 * 3/2001

* cited by examiner

*Primary Examiner* — Irina S Zemel
*Assistant Examiner* — Jeffrey Lenihan

(57) ABSTRACT

A homogenous blend comprising from 10% to 90% by weight of a metallocene catalyzed polyethylene (mPE) and from 90% to 10% by weight of styrene-butadiene block copolymers comprising from 5% to 40% by weight of 1,3 butadiene monomer units and from 60% to 95% by weight of styrene monomer unites. The blend of the invention is used to make peelable films for food packaging applications.

8 Claims, No Drawings

PEELABLE POLYETHYLENE FILMS

This application is a continuation of application Ser. No. 10/564,109, filed Aug. 21, 2006, now U.S. Pat. No. 8,258,237, which is a national stage entry of PCT/EP04/51388, filed Jul. 7, 2004, which claims priority to European Application No. 03102027.4, filed on Jul. 7, 2003.

The present invention relates to compositions of polyethylene and styrene-butadiene block copolymers and films thereof having an excellent peelability. These compositions can therefore be used for film applications requiring this property such as packaging, more particularly food packaging.

It is highly desirable in food packaging applications to have films coveting thermoformed containers that, after having been heat sealed onto said containers can be easily peeled in order to provide an easy opening of the containers by the consumer. These films should thus have desired peelability, sufficient to provide an easy opening of the container while avoiding any miss opening of it during e.g. the storage and/or transport. These films should also have good optical properties and organoleptic properties.

In the present invention, a film is defined as an extremely thin continuous sheet: the upper limit for thickness is of about 250 μm (Hawley's Condensed Chemical Dictionary, Twelfth Edition, Rev. by R. J. Lewis, Van Nostrand Reinhold Co., New York).

In the art, a peelable film is defined as a film, which, after having been heat sealed onto a thermoformed container, can be easily manually removed from it by a soft and regular peeling without causing any damage to the film and without leaving parts of the film on the rim of the container.

WO 01/15897 discloses a transparent heat-sealing film having a sealant layer made of a resin composition which comprises from 50 to 100 wt % of the total of the following components (a) to (c): (a) from 5 to 50 wt % of a block copolymer of from 50 to 95 wt % of a styrene-type hydrocarbon and from 5 to 50 wt % of a conjugated diene-type hydrocarbon, (b) from 5 to 50 wt % of an ethylene/α-olefin random copolymer, and (c) from 5 to 70 wt % of a block copolymer of from 10 to 50 wt % of a styrene-type hydrocarbon and from 50 to 90 wt % of a conjugated diene-type hydrocarbon, and (d) from 0 to 50 wt % of an impact-resistant polystyrene. This document does not address the problem of a peelable film.

EP 1 312 624 discloses a film made of a metallocene catalysed linear low density polyethylene resin. The film is used in seal applications. Nothing is mentioned regarding the peelability of the film.

EP 0 924 062 discloses heat-sealing films. The sealant layer composition comprises: (1) polyethylene homopolymer, ethylene/α-olefin copolymer, ethylene vinyl acetate copolymer, and/or ethylene/acrylate copolymer; and (2) elastomer, plastomer, ionomer, and/or carboxyl-modified polyethylene. Nothing is mentioned regarding the peelability of these films.

EP 0 538 139 discloses a heat sealable and peelable film for polystyrene container comprising at least one layer, said layer comprising a blend of polystyrene and one or more ethylene acrylic derivates copolymers.

WO 94/24205 discloses a sealable, thermoplastic molding composition which can be employed to seal dairy food containers comprising from 20 to 60 percent by weight of an optionally rubber-reinforced styrenic resin; from 30 to 70 percent of a styrene-butadiene-styrene block copolymer and from 4 to 40 percent of a copolymer of ethylene and acrylic acid.

The traditional heat sealable and peelable films known in the art suffer from some major drawbacks. Indeed, these films are sometimes so strongly sealed onto the containers that they cannot be easily peeled without suffering any damage.

In other cases, the films suffer from a lack of sealability onto the containers leading to an opening of the containers during storage and/or transport. This is particularly the case when the containers are made of polypropylene or polystyrene resins.

There is thus a need for producing films that can be sealed onto containers made of polypropylene or polystyrene while being easily manually peelable.

The main object of the present invention is to produce films from compositions of mPE and styrene-butadiene block copolymers that are well sealed onto containers made of polypropylene or polystyrene resins while being peelable.

It would be advantageous if in addition these films would achieve good organoleptic and optical properties.

The present inventor has found that a homogeneous blend comprising from 10% to 90% by weight of a metallocene catalyzed polyethylene (mPE) and from 90% to 10% by weight of styrene-butadiene block copolymers comprising from 5% to 40% by weight of 1,3-butadiene monomer units and from 60% to 95% by weight of styrene monomer units leads to one or more of the objects of the invention.

The films according to the invention are mainly used in food packaging applications such as for fresh products and dairy products, where it is important for the consumer to see the wrapped product.

According to one embodiment, when the container is made of polystyrene, the blend for producing the peelable film contains at least 40% by weight of styrene-butadiene block copolymers, preferably at least 50% by weight of styrene-butadiene block copolymers.

According to another embodiment, when the container is made of polypropylene, the blend for producing the peelable film contains at least 40% by weight of mPE, preferably at least 50% by weight of mPE.

The mPE used in the present invention is a copolymer of ethylene with a comonomer selected from the group consisting of propylene, 1-butene, 1-hexene, 1-octene or 4-methyl-1-pentene, the preferred comonomer being 1-hexene.

The density of the mPE used in the present invention can be regulated by the amount of comonomer injected in the reactor. The density of the mPE may range from 0.906 g/cm³ to 0.963 g/cm³, preferably from 0.910 g/cm³ to 0.960 g/cm³, most preferably from 0.915 g/cm³ to 0.960 g/cm³.

The melt index $MI_2$, according to ASTM D 1238 condition 2.16 kg/190° C., of the mPE used in the present invention can be regulated by the amount of hydrogen injected in the reactor. The melt index of the mPE may range from 0.1 g/10 min to 100 g/10 min, preferably from 0.2 g/10min to 20 g/10 min and most preferably from 0.3 g/10 min to 10 g/10 min.

Preferably, the mPE resin used in the present invention has a rheological long-chain branching index, LCBI, such as defined by R. N. Shroff and H. Mavridis in Macromolecules 2001, 34, 7362-7367 by the equation:

$$LCBI = \frac{\eta_0^{0.179}}{4.8[\eta]} - 1$$

where $\eta_0$ is the limiting, zero-shear viscosity at 190° C. and $[\eta]$ is the intrinsic viscosity in trichlorobenzene at 135° C.

The LCBI is calculated from the best fitting by least squares analysis of the rheological curve (complex viscosity versus frequency) as described in U.S. Pat. No. 6,114,486 with the following generalized Cross equation, i.e.

$$\eta = \eta_0/(1+(\gamma t_0)^n)$$

wherein n is the power law index of the material characterizing the shear thinning behaviour of the material, $t_0$ is the characteristic relaxation time of the material, $\eta_0$ is the zero-shear viscosity, $\eta$ and $\gamma$ are the measured viscosity and shear rate data respectively. The dynamic rheological analysis is performed at 190° C. under nitrogen and the strain amplitude is 10%. Results are reported according to ASTM D 4440.

The LCBI of the mPE used in the present invention is at least greater than 0.14, preferably greater than 0.50, more preferably greater than 1, yet more preferably greater than 2.

According to one embodiment, the styrene-butadiene block copolymer used in the present invention is a transparent high styrenic styrene-butadiene block copolymers comprising from 5% to 40% by weight of 1,3-butadiene monomer units and from 60% to 95% by weight of styrene monomer units, preferably from 15% to 30% by weight of 1,3-butadiene monomer units and from 70% to 85% by weight of styrene monomer units. Examples of transparent styrene-butadiene block copolymer that can be used in the present invention, one can cite the K resin® from Phillips Petroleum and the Styrolux® from BASF.

According to another embodiment, the styrene-butadiene block copolymer used in the present invention has a transmittance of 91% and a haze of 3%, when both are measured according to ASTM D 1003, preferably a transmittance of 91% and a haze of 2% when measured according to ASTM D 1003.

According to still another embodiment, the styrene-butadiene block copolymer used in the present invention has a flexural modulus of 1000 MPa according to ASTM D 790, a tensile strength of 20 MPa according to ASTM D 638, a Notched Izod impact at 23° C. of 20 J/m according to ASTM D 256A, preferably a flexural modulus of 1200 MPa according to ASTM D 790, a tensile strength of 25 MPa according to ASTM D 638 and a Notched Izod impact at 23° C. of 20 J/m according to ASTM D 256A.

The catalyst system used to produce the mPE required by the present invention comprises a metallocene component, preferably a bridged metallocene component. The bridged metallocene component may be any bridged metallocene component known in the art of the general formula:

$$R''(C_pR'_k)_2MQ_{Z-2}$$

wherein $(C_pR'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms and/or two carbon atoms are joined together to form a $C_4$—$C_6$ ring, R'' is a substituted or not substituted $C_1$—$C_4$ alkylidene radical, a dialkyl or diaryl germanium or silicon or an alkyl phosphine or amine radical bridging two $(C_pR'_k)$ rings, Q is a hydrocarbyl radical such as aryl, alkyl, alkenyl, alkylaryl, or aryl alkyl radical having from 1-20 carbon atoms, hydrocarboxy radical having 1-20 carbon atoms or halogen and can be the same or different from each other, k is 4, Z is the valence of the transition metal and M is a group IVb, Vb or VIb transition metal, preferably group IVb transition metal, most preferably zirconium.

According to one preferred embodiment, the bridged metallocene catalyst is ethylene bis (4,5,6,7-tetrahydro-1-indenyl) zirconium dichloride.

The metallocene catalyst utilized to produce the polyethylene required by the present invention can be used in gas, solution, slurry or high-pressure polymerizations.

Standard additives such as antioxidants, antistatic, antifog, anti-UV and antiblocking or slip additives may also be added to the blend according to the invention. If desired, processing aids can also be added.

The present invention also provides the use of the homogeneous blend according to the present invention to produce mono or multilayer films by the cast, blown or coating (co) extrusion processes. When the film is a multilayer film, at least the layer that has to be peelable and that is sealed onto the container is made according to the blend of the invention.

The present invention further provides a process for producing peelable films comprising the steps of
a) preparing a homogeneous blend comprising:
  from 10% to 90% by weight of a mPE and
  from 90% to 10% by weight of styrene-butadiene block copolymers comprising from 5% to 40% by weight of 1,3-butadiene monomer units and from 60% to 95% by weight of styrene monomer units.
b) casting, blowing or coating (co)extruding the blend of step a.

The present invention still further provides the peelable films produced from the blends according to the present invention.

The present invention still further provides the use of the peelable films produced from the blends according to the present invention for food packaging applications.

The peelable films issued from the blends described here above may also be used in the production of lamination films and barrier films.

All the films produced according to the invention present a good sealabilty onto thermoformed containers made of polypropylene or polystyrene resins while being peelable without causing any damage to the films. The peeling behavior of the film made with the blend according to the invention is soft and regular. The films have also good organoleptic and optical properties.

EXAMPLES

1. Polymerization Procedure and Product Composition.

The polymerization of the mPE (R1) used in the blend of the present invention was carried out in a liquid-full slurry loop reactor. Ethylene was injected with 1-hexene together with the catalyst. Isobutane was used as diluent. The metallocene catalyst used was the bridged metallocene ethylene bis (4,5,6,7 tetrahydro-1-indenyl) zirconium dichloride The data concerning the resin R1 in comparison with two low density polyethylene resins, R2 and R3 produced by radical polymerization, are summarized in Table I.

TABLE I

|  | R1 | R2 | R3 |
| --- | --- | --- | --- |
| Density g/cm³ | 0.927 | 0.924 | 0.928 |
| MI₂ g/10 min | 0.9 | 0.8 | 0.8 |

The density was measured at 23° C. according to ASTM D 1505 method and the melt index was measured according to ASTM D 1238 method, condition 190° C./2.16 kg.

The resin R1 presented a long-chain branching index, LCBI, of 0.60. The LCBI of R1 was determined by fitting the generalized Cross equation on the complex viscosity measured according to ASTM D 4440.

2. Blends Preparation.

A blend B1 according to the invention was prepared by mixing:

50% by weight of mPE (R1) and

50% by weight of transparent styrene-butadiene block copolymer known under the trade mark Finaclear® 530 sold by Atofina wherein the amount of styrene monomer units is 77.4% by weight and the amount of 1,3 butadiene monomer units is 22.6% by weight.

The Finaclear® 530 is also characterized by:

a bulk density at 23° C. of 0.82 g/cm$^3$ according to ASTM D 1895-B, a melt flow index at 200° C./5 kg of 11 g/10 min. according to ASTM D 1238 G, a Vicat A softening point 10 N, 50/h of 82° C. according to ASTM D 1525, a heat deflection temperature HDT 120° C./h, 0.46 MPa of 67° C. according to ASTM D 648, a transmittance of 91% according to ASTM D 1003, a haze of 2% according to ASTM D 1003, a flexural modulus of 1200 MPa according to ASTM D 790, a tensile strength of 25 MPa according to ASTM D 638, an elongation at break of more than 200% according to ASTM D 638, a Notched izod impact at −30° C. of 24 J/m according to ASTM D 256 A and a Notched Izod impact at +23° C. of 20 J/m according to ASTM D 256 A.

A comparison blend B2 was prepared by mixing 50% by weight of R2 and 50% by weight of Finaclear® 530.

A comparison blend B3 was prepared by mixing 50% by weight of R3 and 50% by weight of Finaclear® 530.

3. Films Preparation.

The films were blown coextruded films comprising a seal layer consisting of blend B1, B2 or B3 supported on a base layer consisting of resin R1. The total thickness of the film was 50 μm. The thickness of the seal layer was 7 μm. The blends B1, B2 or B3 and the polyethylene resin R1 were coextruded and blown into films on a Collin equipment.

The extrusion parameters for the blends B1, B2 or B3 were as follows:

extrusion temperature: 200° C.

die temperature: 210° C.

length over diameter (L/D) ratio of screw: 25

The extrusion parameters for the resin R1 were as follows:

extrusion temperature: 210° C.

die temperature: 210° C.

length over diameter (L/D) ratio of screw: 25

The films were blown on blown film line equipment characterised by a die of 50 mm, a blow up ratio of 2.55, a die gap of 1.2 mm and a chilled air temperature of 10° C.

Film F1 was prepared from the blend B1 according to the invention. Films F2 and F3 were prepared from the comparative blends B2 and B3.

Films F1, F2 and F3 were then heat-sealed at 170° C. and 175° C. onto polystyrene dairy containers and at 165° C. and 170° C. onto polypropylene dairy containers. The sealing time was 1 second and the seal pressure was comprised between 3.5 and 4 bars. A twelve pm thick foil of polyethylene terephthalate was employed during the sealing between the seal bar of the sealing machine and the films. After heat-sealing, the dairy containers were maintained at 23° C. under 50% relative humidity.

4. Films Properties.

4.1 Peel strength

The peel strength defined as the force necessary for separating the seal layer of the film from the container was measured with a dynamometer at a 90° peeling angle and at a peeling speed of 100 mm/min. The peel strength (S2) expressed in Newton (N) was determined and based upon an average of 3 samples. Besides the peel strength, the strength needed to initially open the container (S1) and the strength needed to tear completely the film from the container after peeling (S3) are also reported in Newton (N) and based upon an average of 3 samples.

Example 1

In this example, the films F1, F2 and F3 have been sealed at 170° C. and 175° C., onto polystyrene dairy containers. S1, S2 and S3 are displayed in table II.

TABLE II

| Films | seal layer | weight ratio | sealing T° = 170° C. Strengths (N) | | | sealing T° = 175° C. Strengths (N) | | |
|---|---|---|---|---|---|---|---|---|
| | | | S1 | S2 | S3 | S1 | S2 | S3 |
| F1 | R1/SBS | 50/50 | 5.6 | 0.8 | 4.3 | 5.8 | 1.0 | 5.2 |
| F2 | R2/SBS | 50/50 | 5.3 | 1.1 | 3.6 | n a | n.a | n.a |
| F3 | R3/SBS | 50/50 | 7.2 | 1.9 | 5.3 | n.a | n.a | n.a | n.a: not applicable. The film melted at the sealing temperature.

This example shows that the films F1, F2 and F3 adhere to the polystyrene dairy container. The adhesion of the film F1 whose seal layer was made with the blend according to the invention could be improved by increasing the sealing temperature at 175° C. whereas at this temperature, the comparative films melted and broke.

Example 2

In this example, the films F1, F2 and F3 have been sealed at 165° C. and 170° C. onto polypropylene dairy containers. The several strengths, S1, S2 and S3 in Newton (N) are displayed in table III.

TABLE III

| Films | seal layer | weight ratio | sealing T° = 165° C. Strengths (N) | | | sealing T° = 170° C. Strengths (N) | | |
|---|---|---|---|---|---|---|---|---|
| | | | S1 | S2 | S3 | S1 | S2 | S3 |
| F1 | R1/SBS | 50/50 | 7.4 | 0.8 | 4.5 | 6.5 | 0.87 | 5.3 |
| F2 | R2/SBS | 50/50 | 5.0 | 0.5 | 3.9 | n.a | n.a | n.a. |
| F3 | R3/SBS | 50/50 | 1.43 | 0.2 | 2.3 | 4.7 | 0.5 | 1.7 | n.a: the measure could not be done because the film melted at the sealing temperature.

The film F1 made with the blend according to the invention shows a better adhesion onto the polypropylene dairy container than those made with the comparative blends. The adhesion of the comparative films F2 and F3 on the polypropylene dairy container is too low to ensure a hermetic closure of the container. The adhesion could not be improved by increasing the heat sealing temperature. This example shows that the adhesion of the film made with the blend according to the invention is sufficient to avoid any use of tie layer between the seal layer and the container.

4.2 Peelability Properties

The peelability of the films of examples 1 and 2 was evaluated.

On polystyrene dairy containers, the peelability of the film made with the blend according to the invention after having been sealed at 170 or 175° C. is excellent. Indeed the peeling is regular, soft and clean all along the rim of the container without causing any damage to the sealable layer, which remains on the base layer.

When the films made with the comparative blends are peeled after having been sealed at 170° C. onto the polystyrene dairy containers, it is observed that the seal layer remains at some places on the rim of the container. There is in fact a detachment of the sealable layer from the base layer. On other places on the rim of the container a rupture of the film is observed. When sealed at 175° C., a total rupture of the films occurs.

On polypropylene dairy containers, the peelability of the film made with the blend according to the invention after having been sealed at 165° C. is regular and soft. Under the same conditions, the peelability of the films made with the comparative blends is too weak. Moreover at some places on the rim of the dairy container there is a rupture of the film.

Regarding the peelability of the films, after having been heat-sealed at 170° C. on polypropylene dairy containers, the peelability of the film made with the blend according to the invention remains soft and regular. The peelability of the film made with the comparative blend R3/SBS is irregular with jerking motions and too weak. In this case, it is also observed a rupture of the film at some places on the rim of the dairy container.

4.3 Organoleptic Properties

A taste panel test with seven people was conducted according to the Afnor certification NF 114, January 2001, 2.5.2 on 250 ml water which has been in contact during four hours with 8 grams of pellets issued from the blend of the invention or from the comparative blends. The pellets were then separated from the water. Said water was then further diluted from one third, from one half and from two third with fresh water in order to get four samples. The taste was detected on each sample. A note of zero may be attributed when the panel detected no taste on the water that has been separated from the pellets. A note of 0.5 may be attributed when the panel detected a taste on the water that after having been separated from the pellets was further diluted from one third with fresh water. A note of 1 may be attributed when the panel detected a taste on the water that after having been separated from the pellets was further diluted from one half with fresh water and a note of 2 may be attributed when a taste on the water that after having been separated from the pellets was further diluted from two third with fresh water was detected. The results are displayed in table IV.

TABLE IV

| Blends | Note |
| --- | --- |
| B1 (example) | 0.5 |
| B2 (comparative) | 1 |
| B3 (comparative) | 0.5 |

4.4 Optics

The optical properties of the films F1, F2 and F3 were measured and are given in table V. The gloss was measured at an angle of 45° with the Byk-Gardner micro-gloss reflectometer according to ASTM D-2457, the haze was measured with the Byk-Gardner Hazegard® system according to ASTM D-1003.

TABLE V

| Films | Gloss 45° | Haze (%) |
| --- | --- | --- |
| F1 (example) | 47.9 | 17.6 |
| F2 (comparative) | 51.8 | 25.3 |
| F3 (comparative) | 45.5 | 21.2 |

The haze is improved with the film comprising as sealable layer the blend according to the invention.

The invention claimed is:

1. A homogenous blend comprising 10-90 wt. % of a metallocene catalyzed ethylene polymer, wherein the LCBI of the metallocene catalyzed ethylene polymer is greater than 1 and from 10-90 wt. % of a styrene-butadiene block copolymer having from 5-40 wt. % of 1,3-butadiene monomer units and from 60-95 wt. % styrene monomer units, wherein either the metallocene catalyzed ethylene polymer or the styrene-butadiene block copolymer are present in the composition in an amount of greater than 50 wt. %.

2. The homogenous blend of claim 1 wherein said composition contains at least 40 wt. % of said styrene-butadiene block copolymer.

3. The homogenous blend of claim 2 wherein said composition contains at least 40 wt. % of said metallocene catalyzed ethylene polymer.

4. The homogenous blend of claim 1 wherein said metallocene catalyzed ethylene polymer is a copolymer of ethylene with a comonomer selected from the group consisting of propylene, 1-butene, 1-hexene, 1-octene and 4-methyl-1-pentene.

5. The homogenous blend of claim 4 wherein said comonomer is 1-hexene.

6. The homogenous blend of claim 1 wherein said styrene-butadiene block copolymer comprises 1,3-butadiene monomer units in an amount within the range of 15-30 wt. % and styrene monomer units in an amount within the range of 70-85 wt. %.

7. The homogenous blend according to claim 6 wherein the styrene-butadiene block copolymers have a transmittance of 91% and a haze of 3% when both are measured according to ASTM D 1003.

8. The homogenous blend of claim 1 wherein said metallocene catalyzed ethylene polymer is produced by the polymerization of ethylene in the presence of a catalyst system comprising a bridged metallocene catalyst component.

* * * * *